US008322239B2

(12) United States Patent
Isono et al.

(10) Patent No.: US 8,322,239 B2
(45) Date of Patent: Dec. 4, 2012

(54) ELECTRONIC DEVICE CONTROLLER

(75) Inventors: Takahiro Isono, Chiba (JP); Masashi Tokita, Chiba (JP)

(73) Assignee: Futaba Corporation (JP)

( * ) Notice: Subject to any disclaimer, the term of this patent is extended or adjusted under 35 U.S.C. 154(b) by 1265 days.

(21) Appl. No.: 12/049,865

(22) Filed: Mar. 17, 2008

(65) Prior Publication Data

US 2008/0229864 A1    Sep. 25, 2008

(30) Foreign Application Priority Data

Mar. 20, 2007    (JP) .................................. 2007-072817

(51) Int. Cl.
*F16H 35/18*    (2006.01)
(52) U.S. Cl. ...................................................... 74/10.41
(58) Field of Classification Search ................. 74/10.37, 74/10.39, 10.41, 491, 553, 578
See application file for complete search history.

(56) References Cited

U.S. PATENT DOCUMENTS

| | | | | |
|---|---|---|---|---|
| 4,779,305 | A | * | 10/1988 | Gorsek .......................... 16/441 |
| 5,152,187 | A | * | 10/1992 | LaFemina ....................... 74/553 |
| 5,303,612 | A | * | 4/1994 | Odom et al. .................... 74/553 |
| 7,000,262 | B2 | * | 2/2006 | Bielefeld ......................... 2/418 |

FOREIGN PATENT DOCUMENTS

| | | |
|---|---|---|
| JP | 62-157104 S | 10/1987 |
| JP | 8273484 A | 10/1996 |
| JP | 2000294413 A | 10/2000 |
| JP | 2006-102011 | 4/2006 |
| JP | 2006102011 | 4/2006 |

OTHER PUBLICATIONS

German Patent and Trademark Office, Office Action, Application No. 10 2008 014 639.0, Jul. 9, 2012.

* cited by examiner

*Primary Examiner* — Vicky Johnson
(74) *Attorney, Agent, or Firm* — Quarles & Brady LLP

(57) ABSTRACT

A controller capable of realizing continuous click feelings within an operation range of the controller and a specific click feeling at a specific position of the operation range with continuous natural maneuvering feeling. When a first member to which an element shaft of an electronic device is fixed is rotated relatively to a second member to which an element body of the electronic device is fixed to rotate the shaft, the controller adjusts the control amount the element. A notch array, formed of a serration and a first pawl, and a position confirmation means, formed of a notch and a pawl, are disposed between the first member and the second member. Both members are disposed oppositely with respect to the shaft. A center click feeling, different from the feeling in the notch array, can be obtained at the center within the range of the notch array.

3 Claims, 7 Drawing Sheets

ELECTRONIC DEVICE CONTROLLER

CROSS REFERENCES TO RELATED APPLICATIONS

This application claims the priority benefit of Japanese Patent Application No. 2007-072817 filed on Mar. 20, 2007, which is fully incorporated herein by reference.

STATEMENT REGARDING FEDERALLY SPONSORED RESEARCH

Not Applicable.

BACKGROUND OF THE INVENTION

1. Field of the Invention

The present invention relates to a controller, for example, a stick lever or a volume control, capable of adjusting the operation amount of an electronic device through the movement of a control member by an operator. Particularly, the present invention relates to a controller that can provide a specific click feeling at a specific position, for example, the center position, within a predetermined operation range of the controller, as well as a control click feeling within the entire operation range of the controller.

2. Description of the Prior Art

In the transmitter used for model radio control devices, a controller or maneuvering device is installed that sets and adjusts various operation amounts of an object to be manipulated, such as a model airplane. For example, the controller installed to the radio control transmitter that manipulates a model airplane includes a joy stick lever for operating various channels for throttle, aileron, elevator and ladder, a trim for fine adjusting each channel, a side lever for adjusting the number of revolutions of an engine and a pitch angle of a propeller, and volume controls. An operator or manipulator operates the controller with his fingertips to set and adjust various control amounts for controlling an object to be manipulated.

Some controllers include a click generation means that produces a click feeling to a fingertip of the operator which represents a physical indication of an operation amount of the controller by the fingertip. The click feeling means a delicate mechanical resistance transmitted to the controller in response to an operation of the controller, or a delicate mechanical resistance transmitted to the controller which is produced by snapping a catch or pawl into a position when the controller is operated, or a feeling similar to the feeling felt by an operator due to the mechanical resistance. For example, the click feeling is a physical reference for recognizing either how much a controller, such as a volume control, is rotated or the specific position within the operation range of the controller.

In order to control a model airplane with a radio control transmitter, the operator normally operates the transmitter at hand with only fingertip feeling, while watching an object to be manipulated. In this mode of the operation, it is considered that the click generation mechanism for producing the click feeling is an important factor for the controller in the radio control transmitter. A notch array, for example, is known as a typical click generation means. The notch array includes a serration formed in the movable range of the controller along an operation direction for which a pawl can be engaged. The serration means a mechanical structure in which a large number of sawlike teeth or notches is formed continuously and alternately in the operation direction along the edge. The Japanese patent publication No. 2006-102011 discloses a radio control transmitter which includes a side lever having a notch array acting as a click generation means.

Furthermore, in the operation range of the controller for the radio control transmitter, it is preferable to obtain a specific click feeling at a specific position within an operation range to recognize the current setting position of the controller. For example, in the controller having a predetermined operation range adjustable in both divergent directions from the neutral point, it is convenient for the manipulation of the controller to know the neutral point by feel during the operation. Thus, a click generation means that produces the specific click feeling, namely center click feel, when the controller comes to the central position of the operation range is preferably provided in the controller.

More specifically, in the notch array including the serration and the pawl, a notch deeper than other notches, which is one of the notches of the serration, is formed at the center of the serration region which is formed continuously over the operation range of the controller. The pawl is formed of a metal spring and is moved so as to engage with the notches one by one including the deep notch.

According to the notch array explained hereinabove, the click feeling can be obtained continuously over the operation range of the controller due to the notch array formed in the serration and the pawl made of metal-spring. At the center of the operation range, the pawl snapping into the deep notch allows a stronger click feeling so that the center position of the operation range can be sensed physically.

However, there are several drawbacks in the conventional controller which is provided with the deep notch for producing the center click feeling which is disposed at the specific point over the operation range of the controller, such as the center of the continuous serration. Firstly, if the bottom angle of the notch in the serration or the peak angle of the tooth in the serration is fixed, and the notch which is deeper than other notches is formed at a specific point of the serration, the pitch between notches or teeth of the serration is widened. In other words, the gap between teeth of the serration of the deep notch at the specific point becomes larger than the gaps of the other serration. The notch and tooth pitch forming the serration at the specific point is different from those at other portions. The uneven pitch leads to varying the variation amount per pitch between the region including the specific point and other portions during operation, and thus the maneuvering feeling of the controller becomes less appealing. If the notch and tooth pitch of the serration including the specific point is constant, it is impossible to form the deeper notch at the specific point of the serration so long as the bottom angle or the peak angle of the serration is fixed.

In the controller with the conventional click generation means, the serration is molded with a resin material, and a pawl made of a metal spring is engaged with the serration so that a predetermined click feeling is obtained. However, it is not necessarily technically easy from the manufacturing stand point to use two kinds of materials including resin and metal and to machine and assemble them to produce the predetermined click feeling. As a result, the production costs increase. For this reason, it is convenient to manufacture the whole of the click generation means with resin only, if possible. However, it is difficult to employ the pawl made of a resin in the click generation means, because the variation amount of a resin, or the spring or resilient property of a resin is small as compared with metal. Furthermore, it is impossible to increase the difference between the notch depth at the specific point and the notch depths in other portions of the serration so that the different click feeling between the specific point and other points may be obtained. Moreover, the resin tends to change its elastic force due to changes in temperature and easy to plastic deform. Thus, the resin is difficult to provide the specific click feeling at the specific position. Generally, the pawl made of the resin cannot provide a sufficient deformation stroke in the deep notch at the specific position of the serration due to plastic deformation, and the specific click feeling cannot be obtained at the specific position.

SUMMARY OF THE INVENTION

The present invention is to provide a controller for an electronic device which eliminates the problems of the controller with the conventional click generation means. Accordingly, an object of the present invention is to provide a controller for an electronic device, which realizes a continuous smooth click feeling within the operation range of the controller and a specific smooth click feeling at a specific position without unpleasant feeling.

According to the present invention, there is provided a controller for an electronic device that adjusts the operation amount of the electronic device through a relative movement of a first member and a second member by an operator. The controller includes a notch array having a continuous serration and a first pawl. The serration is formed along a relative moving direction of one of the first member and the second members, the first pawl is formed on the remaining one of the first and the second members and is engageable to the continuous serration, while moving along the continuous serration and a position confirmation means disposed at a position different from the notch array. The position confirmation means includes a notch and a second pawl. The notch is formed on one of the first and the second members within a relative movement range of the first and the second members, and the second pawl is disposed to the remaining one of the first and the second members and is engageable to the notch.

According to the controller of the present invention, the direction of the continuous serration and the direction of the first pawl in the notch array and the direction of the notch and the direction of the second pawl in the position confirmation means are disposed to be perpendicular to the relative moving direction of the first and the second members. The relative movement of the first and the second members may be rotational movement. The notch array and the position confirmation means are disposed oppositely with respect to the center of rotation of the first and the second members. In an alternative embodiment of the present invention, the notch array and the position confirmation means are disposed vertically on the same side with respect to the center of rotation of the first and the second members. The relative movement of the first and the second members may be straight movement, and the notch array and the position confirmation means are arranged at the two different positions in a direction perpendicular to the straight movement.

In the electronic device controller of the present invention, the notch array for continuously producing a click feeling according to the operation amount within the operation range of the controller and the position confirmation means disposed at the predetermined position within the operation range of the controller for producing the specific click feeling are disposed independently at different positions of the first and second members of the controller so that respective click feelings are determined separately. Thus, the click feeling different from the click feeling resulting from the notch array can be produced at the specific position in the notch array having the serration of the predetermined pitches. Accordingly, the click feeling at the specific position within the operation range can be easily noted without a particular feeling different from the click feelings due to continuous operations of the controller within the operation range.

In the notch array and the position confirmation means of the electronic device controller of the present invention, the direction in which the notches of the notch array are engaged to the pawl of the position confirmation means is perpendicular to the relative traveling direction to the first and the second members. Because the pawl is pressed against and engaged to each notch with the resilient force, the pawl is firmly engaged with the notch, and particular click feeling can be obtained when the pawl snaps into the notch, and the two kinds of click feeling can be obtained through the relative rotation of the first and the second members. The notch array and the position confirmation means are positioned in the opposite direction with respect to the rotational center of the first and the second members. Further, the notch array and the position confirmation means can be disposed vertically on the same side with respect to the rotational center of the first and the second members.

In the electronic device controller, the controller travels linearly and both notch array and the position confirmation means can be arranged at the two positions in the direction perpendicular to the linear movement of the controlling member. For example, both notch array and the notch may be arranged on two sides perpendicular to the linearly traveling controlling member. Alternatively, both notch array and the notch may be disposed to be vertically on one of the two sides perpendicular to the linearly traveling controlling member.

DETAILED DESCRIPTION OF THE INVENTION

Figure 1:
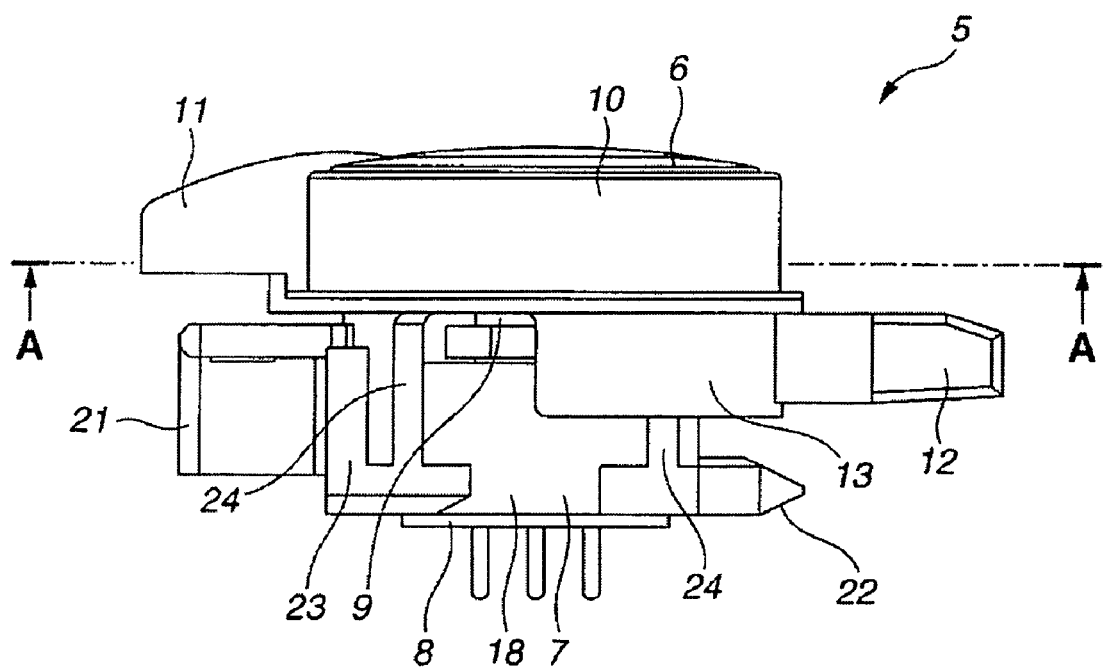
FIG. 1 is a front view illustrating a controller for an electronic device according to a first embodiment of the present invention.
Figure 2:
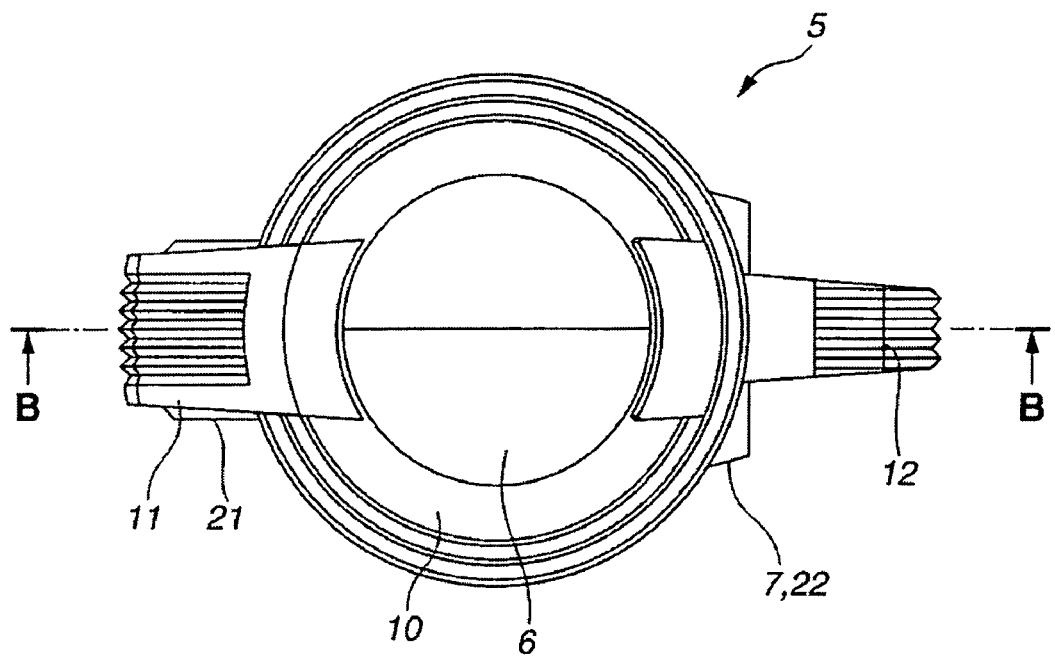
FIG. 2 is a plan view of the controller shown in FIG. 1.
Figure 3:
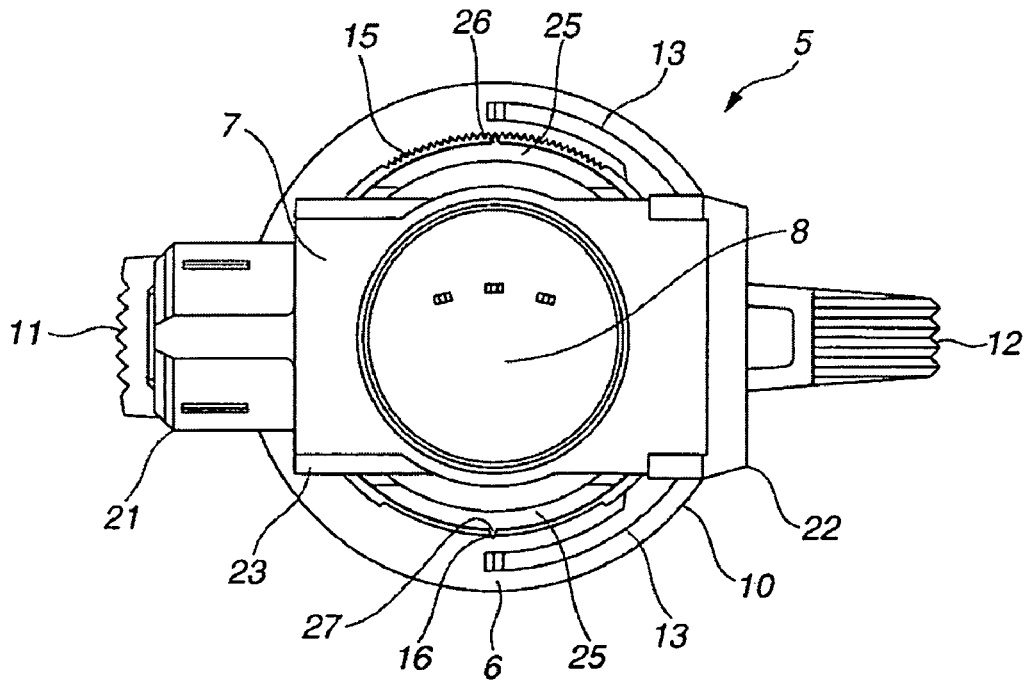
FIG. 3 is a bottom view of the controller shown in FIG. 1.
Figure 4:
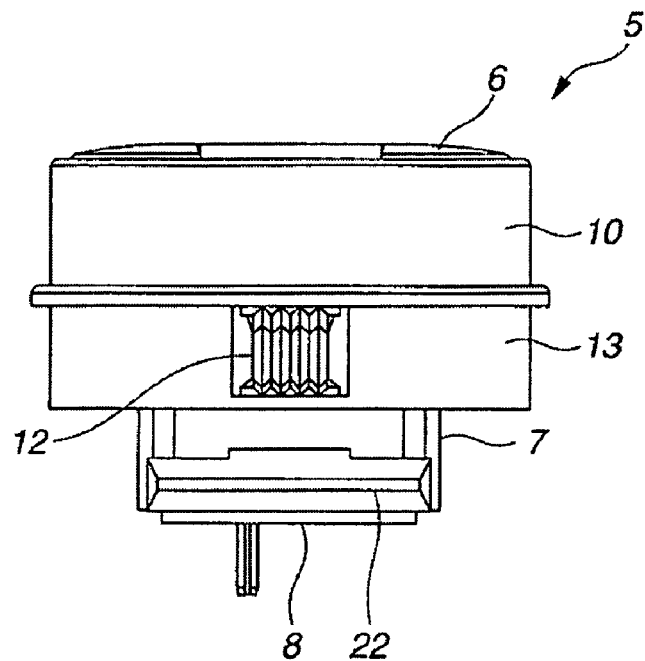
FIG. 4 is a right side view of the controller shown in FIG. 1.
Figure 5:
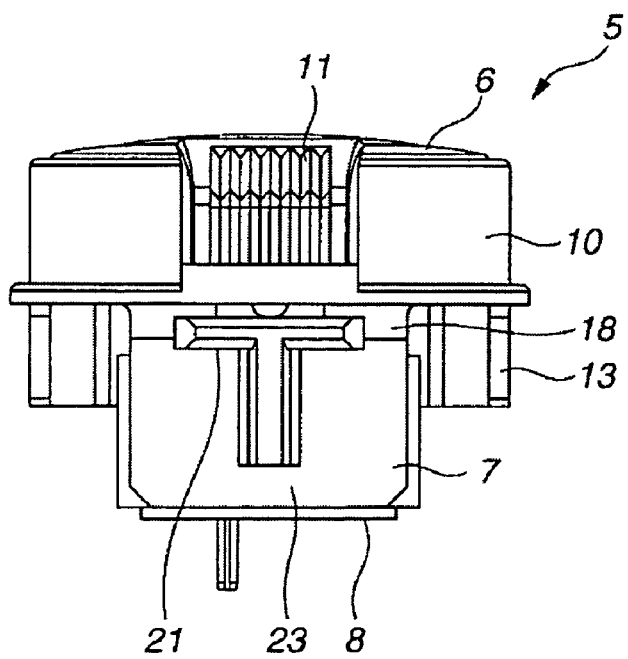
FIG. 5 is a left side view of the controller shown in FIG. 1.

Embodiments of the present invention will be described below by referring the attached drawings.

Referring now to a first embodiment shown in FIGS. 1 to 7 and FIG. 11, the radio control transmitter 1 shown in FIG. 11 comprises two stick levers 3 disposed on the front side of a body 2, trim switches 4 for effecting a fine adjustment of each channel to be operated with the stick lever 3 disposed below each lever, side levers 5 each for adjusting the revolutions of an engine and the pitch angle of a propeller disposed on the upper sides of the cabinet. The controller of the present invention will be explained by way of an example of the side lever 5.

Figure 6:
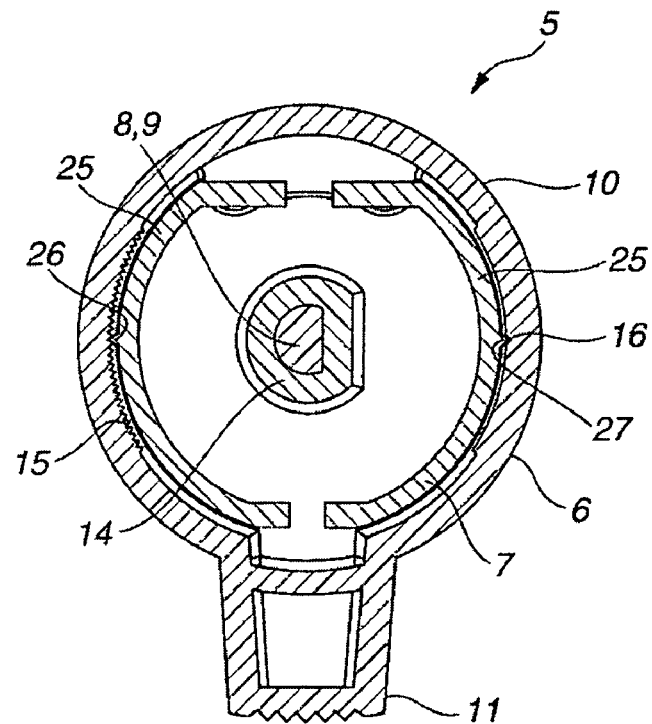
FIG. 6 is a cross sectional view illustrating a portion of the controller taken along the line A-A of FIG. 1.
Figure 7:
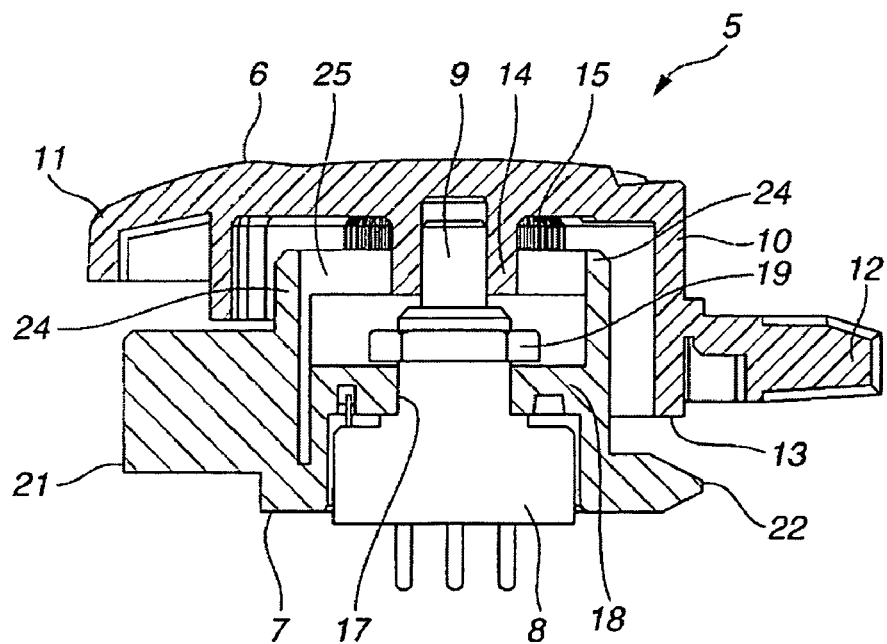
FIG. 7 is a cross sectional view illustrating a portion of the controller taken along the line B-B of FIG. 2.

FIGS. 1 to 5 show the outer appearance of the side lever 5 and FIGS. 6 and 7 show the cross section thereof. As shown in FIGS. 1 to 7, the side lever 5 has a first and a second members 6 and 7 combined together to rotate relatively by an operator, and a volume control 8 as an electronic element disposed between the first and the second members 6 and 7 which is rotated with the rotating of the first member 6 relative to the second member 7.

The volume control 8 used in this embodiment is an element for arbitrarily controlling the control amount such as electrical resistance when turning the rotational shaft 9 attached to the element.

As shown particularly in FIGS. 6 and 7, the first member 6 includes a flat cylindrical base 10 having the upper flat surface and the lower open surface. Two operation levers 11 and 12 are disposed on the outer surface of the side wall of the base 10 protruding circumferentially and outwardly at the opposite directions. The first member 6 is a movable member rotating relative to the second member 7 when an operator acts on the levers 11 and 12 which will be explained hereinafter. A semi-circular stopper member 13 extends from the lower end of the peripheral wall of the cylindrical base 10 within the rotational angles of 180° acting the lever 12 as the center. In other words, a half of the peripheral wall of the base 10 on which the stopper member 13 is attached is wider than a half of the remaining peripheral wall. The stopper member 13 abuts against partially the second member 7 when the first member 6 rotates relative to the second member 7 so as to regulate the rotatable range.

A boss 14 is formed so as to protrude downward from the lower surface of the upper wall of the base 10 to receive and secure the rotational shaft 9 of the volume control 8. The insertion hole formed in the boss 14 is conformed to a semi-circular end of the rotational shaft 9 of the volume control 8, or to a non-circular shape of the shaft viewed from the cross section perpendicular to the axis of the shaft. The boss functions as a stopper for rotating the rotational shaft 9 inserted into the hole. The rotational shaft 9 of the volume control 8 can be rotated through the rotation of the first member 6.

On the inner circumferential surface of the side wall of the cylindrical base 10, serration 15 acting as continuous irregular surfaces configuring part of the notch array is formed. The serration 15 of the notch array is formed along the inner circumferential surface of the side wall at the position where the center line running of two levers 11 and 12 intersects a line perpendicular to the center line as a center. The serration 15 is formed over the extent of the rotational degree of 45° from the center along the rotational direction of the first member 6. A single notch 16 is formed in the inner surface of the side wall of the base 10 for the confirmation of the position of the side lever 5. The notch 16 is formed at the position opposite to the center of the serration 15, namely the center of the rotation of the first member 6. The shape of the notch 16 is the same as the shape of each notch of the serration 15.

As shown particularly in FIGS. 1, 6, and 7, the second member 7 is open at the lower portion and includes a nearly cylindrical housing 18 in which a shaft hole 17 is formed on the upper surface. The electronic element, such as the volume control 8, is inserted into the housing 18 from the lower opening having the rotational shaft 9 directed upward. The rotational shaft 9 protrudes upward from the shaft hole 17 and the volume control 8 protruding from the shaft hole 17 is secured integrally to the housing 18 by means of a fixing nut 19.

The outer surface of the housing 18 is provided with shoulder portions 21 and 22 disposed at two circumferentially confronting portions of the housing 18. When the controller is assembled in the cabinet 2 of the radio control transmitter 1, the shoulder portions 21 and 22 are engaged at the mounting position of the cabinet 2. Thus, the second member 7 is securely fixed to the cabinet 2, while the first member 6 is rotated by an operator. The shoulder portion 21 is provided with a lock plate 23 so that both ends of the semi-circular stopper member 13 abuts against both sides of the lock plate 23 to regulate the rotatable operation range of the first member 6 when the first member 6 is rotated.

The circumferential walls 24 are formed between the housing 18 and the two shoulder portions 21 and 22, and the upper ends of two circumferential walls 24 are linked together by means of two semi-circular leaf springs 25 keeping the volume control 8 as a rotational center. The dimensions, plate thickness and height of the spring 25 are determined to obtain a predetermined spring or resilient property. The first and the second pawls 26 and 27 are respectively formed at the centers of the outer circumferential surfaces of each spring 25.

The first pawl 26 as a functional element of the notch array engages movably to the serration 15 with the resilient force of the spring 25. When the first member 6 is rotated, the first pawl 26 snaps and catches into the position of the serration 15 to give rise to the predetermined click feeling to the operator.

The second pawl 27 as a functional element of the position confirmation means moves along the inner circumferential surface of the side wall of the base 10 of the first member 6 with the resilient force of the spring 25, and form the position confirmation means together with the notch 16. The second pawl 27 falls into the notch 16 by the rotation of the first member 6 so that the operator can feel the center click feeling different from the click feeling produced from the notch array.

The first and the second members 6 and 7 to which the volume control 8 is attached are combined such that the stopper 13 and each locking plate 23 are not overlapping each other and are disposed in the opposite direction. When the rotational shaft 9 of the volume control 8 is securely inserted into the boss 14 of the first member 6, the pawls 26 and 27 of the springs 25 of the second member 7 contact to the inner periphery surface of the side wall of the base 10 of the first member 6 under the resilient force of the each spring 25.

In the side lever 5 of the first embodiment of the present invention explained hereinabove, the notch array and the position confirmation means respectively include the springs 25 at different positions opposite to the rotational shaft 9 of the volume control 8 to be operated. Each of the springs can provide a separate click feeling, namely a click feeling different from the click feeling caused by the notch array and a click feeling when the pawl is snapped into the specific position, namely the center position in the notch array. Accordingly, the specific click feeling at the position, namely the center position within the operation range can be easily discriminated from the click feelings through continuous operations within the operation range. Furthermore, the notch array produces continuous click feeling through rotational operation within a predetermined operation range over which the volume control 8 can be rotated through the rotation of the first member. The second pawl 27 in the position confirmation means is snapped into the notch 16 at the middle of the operation range. At this point, the click feeling can be set larger than the click feeling of the notch array so that the operator can sense that the setting position of the volume control 8 has come to the center position or neutral position of the operation range. The first pawl 26 of the notch array, the second pawl 27 of the position confirmation means, and the respective notches have the same shape as that of each notch of the serration 15 in the notch array. Accordingly, the notch array and the position confirmation means have the same variation amount when the pawl moves along the tooth of the serration one by one and do not create any inconveniences in the physical difference between the operation amount of the lever and the click feeling due to positions of the operation.

In the notch array and the position confirmation means according to the side lever 5, the direction of engaging the serration 15 with the first pawl 26 and the direction of engaging the notch 16 with the second pawl 27 coincide with the bias direction of the spring 25 against the pawls 26 and 27. The bias direction corresponds to the radius direction perpendicular to the rotational direction of the member. Accordingly, the pawl 26 is pushed in the direction where the pawl is engaged to each notch of the serration 15 by the spring 25, while the pawl 27 is pushed in the direction where the pawl is engaged to the notch 16 by the spring 25 so as to ensure the firm engagement of the pawls and the notches. When the pawl 26 or 27 engages with the sawlike notches or snaps into the notch 16, the operator can senses a firm click feeling.

The notch array and the position confirmation means are disposed oppositely with respect to the center of the rotation of the side lever 5. However, both notch array and the position confirmation means may be disposed vertically at the same position with respect to the rotational center.

Figure 8:
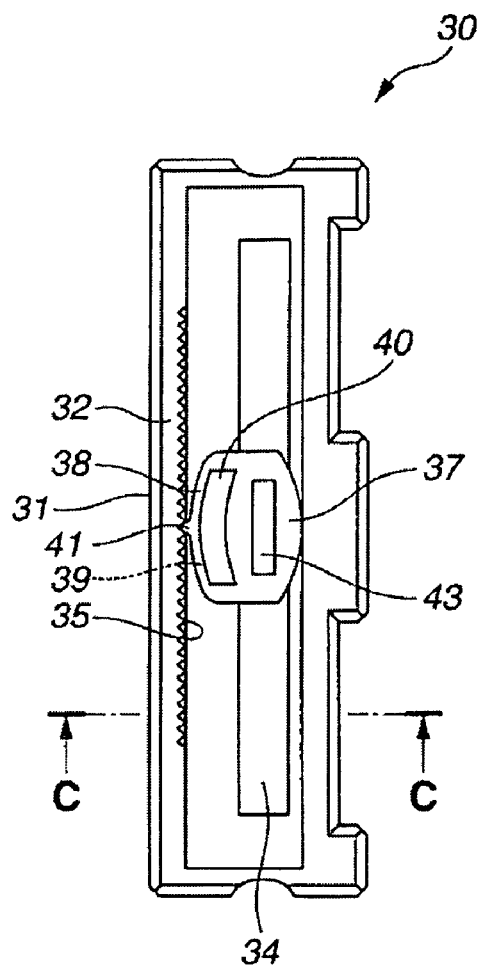
FIG. 8 is a plan view illustrating a controller for an electronic device according to a second embodiment of the present invention.
Figure 9:
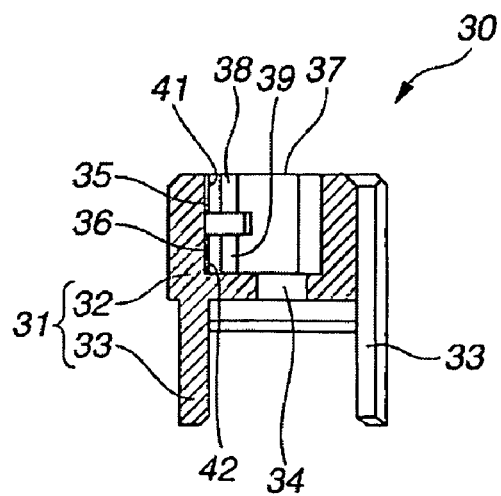
FIG. 9 is a cross sectional view illustrating a portion of the controller taken along the line C-C of FIG. 8.

Reference is made to a second embodiment shown in FIGS. 8 and 9. According to the first embodiment, the rotational shaft 9 of the volume control 8 is rotated through the relative rotation of the first and the second members 6 and 7. However, without being restricted to the relative rotational movement of the two members for operating the electronic element, a rotational straight movement of the two members may be applied in the present invention. In other words, a controller which controls an electronic element having a slide switch structure may be applied in the present invention.

Figure 11:
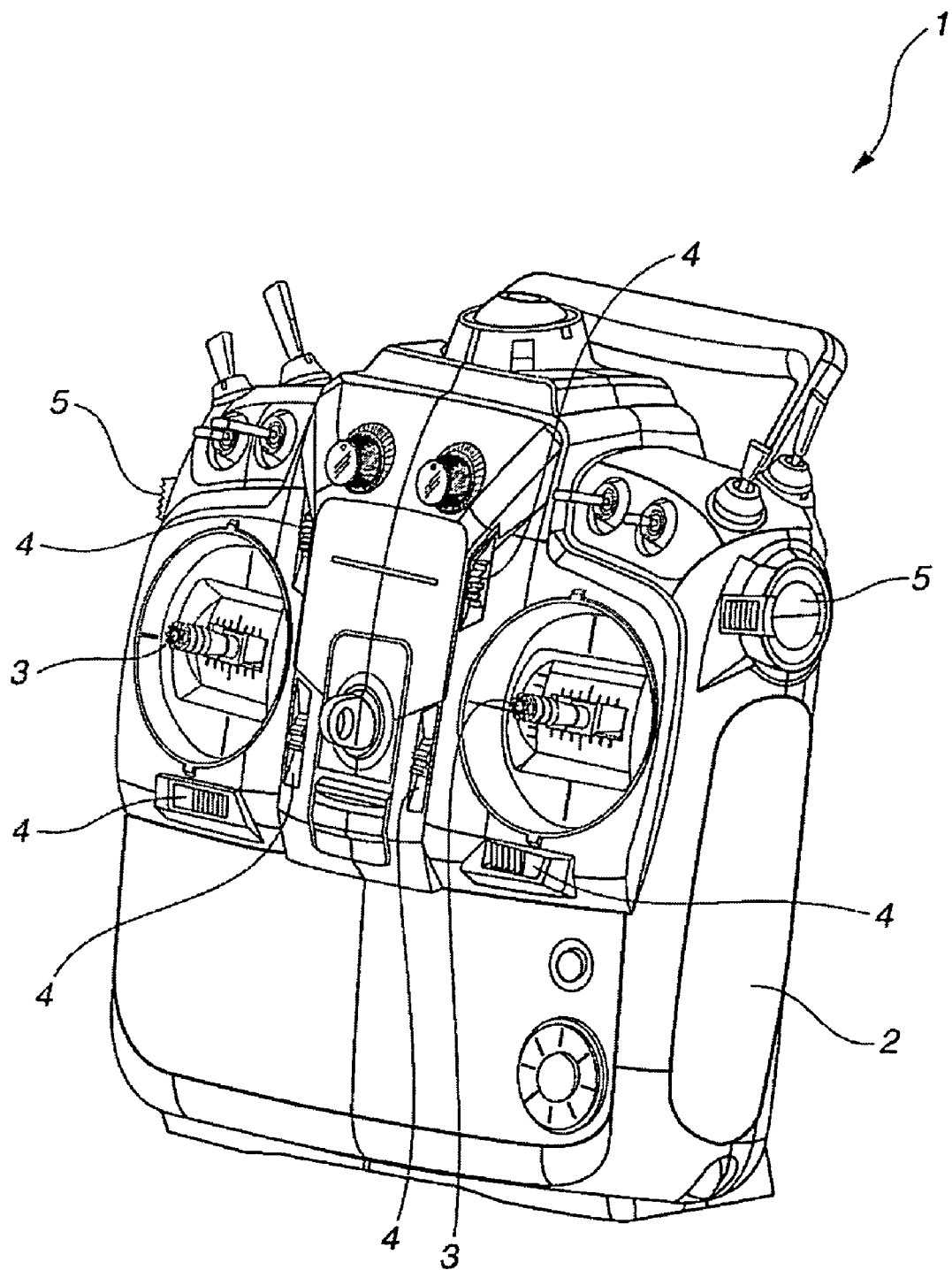
FIG. 11 is a perspective view illustrating a radio-control transmitter as an example of an electronic device to which a controller according to an embodiment of the present invention is installed.

In the radio control transmitter 1, for example, shown in FIG. 11, the slide switch may be used as the trim switch 4 which effects a fine adjustment of the respective channels operated with the stick lever 3. The controller according to the second embodiment may be applied to the trim switch.

As shown in FIGS. 8 and 9, the controller 30 of the second embodiment includes a box-shaped first member 31 to be fixed to the radio control transmitter 1. The first member 31 has a rectangular parallelepiped base 32 having a cavity and an upper open surface and legs 33 projecting from a pair of longitudinal sides on the lower surface of the base 32. Each leg 33 functions as an attachment to be fixed to a cabinet (not shown) of the radio control transmitter and acts as a base member for mounting a slide type or direct action type electronic switch element. A rectangular opening 34 is formed in the bottom plate of the base 32 along the longitudinal side of the base 32. The slide type or direct action type electronic switch element used in this embodiment is to control an amount of electrical resistance arbitrarily by reciprocating linearly an operation shaft mounted to the electric element.

In the controller shown in FIG. 8, the serration 35, namely continuous sawlike notches, is formed longitudinally on the inner upperside surface of the base 32. The serration 35 acts as a part of the notch array, and a single notch 36 acting as a part of the position confirmation means is formed in the inner longitudinal side surface of the base 32. The shape of the notch 36 conforms to that of the sawlike notches in the serration 35.

A slider 37 acting as the second member operated by an operator is mounted in the cavity of the base 32 of the first member 31 so as to travel longitudinally along the base 32. The slider 37 has the shape of a spindle surrounded by two curved long sides protruding outward and two linear short sides as shown in the plan view of FIG. 8. The slider 37 is a nearly U-shaped block having an opening at the middle portion of one side of the slider so that the upper long side 38 and the lower long side 39 are divided by the opening. The slider 37 is formed of the monolithic molding of resin.

Also, there are provided curved rectangular blanked portions 40 along the outline of the upper long side 38 and the lower long side 39 of the slider 37 contacting with the inner surface of the cavity of the first member 31. The blanked portions 40 provide a resilient property with the long sides 38 and 39 of the slider. A first pawl 41 is formed on the center of the outer upper long side 38 of the slider 37 so as to engage resiliently with the serration 35. In addition, a second pawl 42 is formed on the center of the outer lower side 39 of the slider having the same resilient property so as to engage resiliently with the inner surface of the cavity of the first member 31 having the notch 36. The slider 37 is provided with an attachment hole 43 vertically penetrating the base of the slider 37. The operation shaft of an electronic element, which is disposed by means of the plate 33 of the first member 31, is securely inserted into the attachment hole 43 through the opening 34 of the first member 31. Alternately, the operation shaft of the electronic element may be secured to the attachment hole 43 of the slider by means of a joint member. In this manner, the slider 37 is inserted and locked into the cavity of the first member 31 and the electronic element is secured to the slider 37 via the opening 34, and the first member 31 and the slider 37 are assembled integrally with the electronic element. In this state, the upper long side 38 and the lower long side 39 of the slider 37 are pushed into the cavity to be in a resiliently deformed state. Thus, the first pawl 41 of the upper long side 39 and the second pawl 42 of the lower long side 39 of the slider 37 are in contact with the inner long side surfaces of the base 32 of the first member 31 under the resilient forces, respectively.

As to the controller 30 in the second embodiment, the notch array and the position confirmation means include different spring members on the upper long side 38 and the lower long side 39 disposed at different positions of the upper and lower side surface of the slider 37, respectively. Therefore, different click feelings can be provided. At a specific position, namely the center in the notch array in the second embodiment, a click feeling can be produced different from the click feeling caused by the notch array. Therefore, the click feeling experienced at the center position in the operation range can be easily distinguished from the click feelings of continuous operations of the slider within the operation range.

According to the controller 30 in the second embodiment, the notch array produces continuous click feelings by moving the slider 37 within the predetermined operation range over which the slider 37 can be pushed to move the operation shaft of the electronic element. Thus, since the second pawl 42 of the position confirmation means snaps into the notch 36 at the middle of the operation range, the click feeling larger than the click feeling due to the notch array can be produced. Thus, the operator notices that the electronic element has been set at the center point or neutral point of the operation range.

In the second embodiment, the first pawl 41 in the notch array and the second pawl 42 and the notch 36 in the position confirmation means have the same shape as that of the sawlike notches of the serration 15 of the notch array. Thus, the variation amounts of the pawls are equalized where the pawls in the notch array and the position confirmation means move along the teeth of the serration one by one. Thus, there is little difference in click feeling due to the operation amount of the slider.

According to the controller in the second embodiment, the direction of engaging the serration 35 with the first pawl 41 and the direction of engaging the notch 36 with the second pawl 42 coincide with the direction in which the pawl 41 is biased by the resilient force on the upper long side 38 of the slider 37, and with the direction in which the pawl 42 is biased by the resilient force on the lower long side 39 of the slider. The bias direction is perpendicular to the traveling direction of the slider. The pawl 41 is pushed in the direction where the pawl 41 engages with the serration 35 due to the resilient force of the upper long side 38 of the slider 37, while the pawl 42 is pushed in the direction where the pawl engages with the notch 36 due to the resilient force of the lower long side 39 of the slider 39 so as to ensure the firm engagement of the pawls and the notches. When the pawls 41 and 42 snap into the notches by moving the slider 37, a firm click feeling can be sensed.

Figure 10:
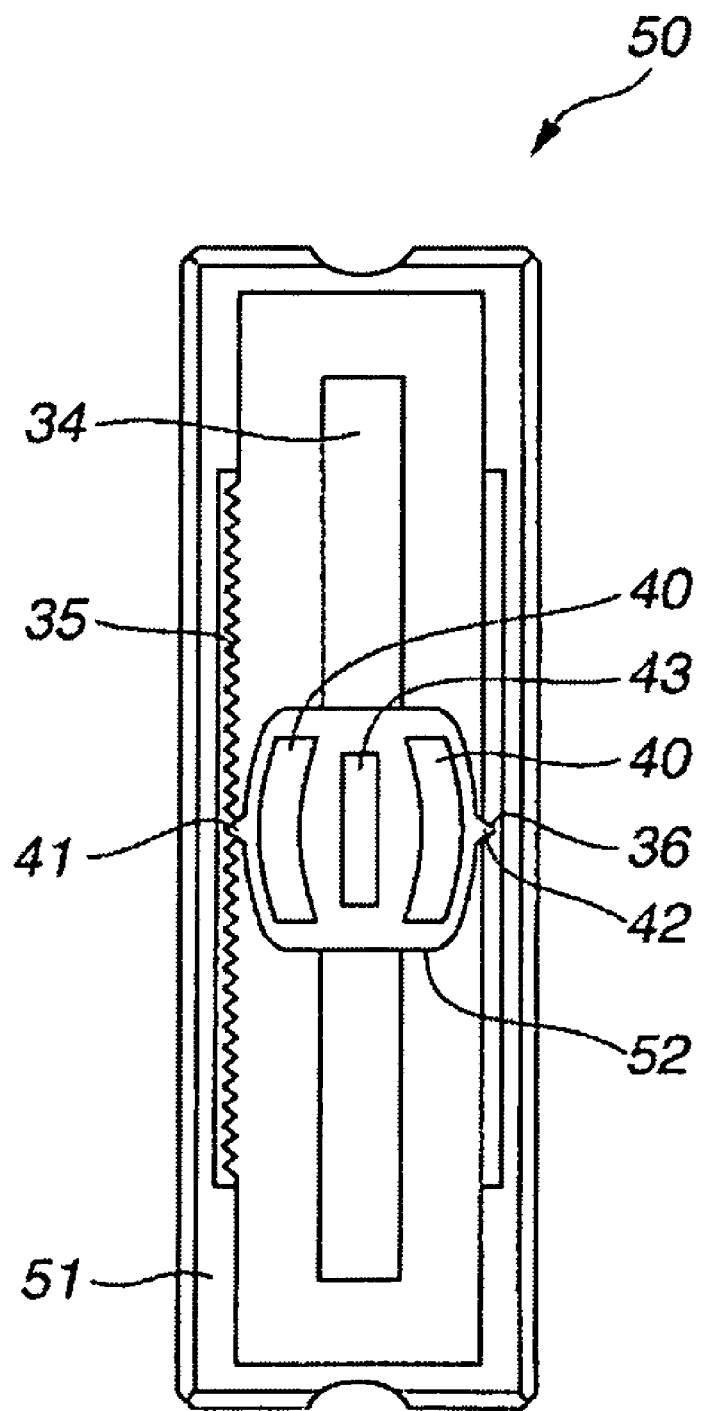
FIG. 10 is a plan view illustrating a controller for an electronic device according to a third embodiment of the present invention.

Reference is made to a third embodiment shown in FIG. 10. In the controller 30 in the second embodiment, the notch array and the position confirmation means are arranged vertically on one side surface in parallel with the sliding direction of the slider 37. However, in the controller 50 in the third embodiment shown in FIG. 10, the notch array and the position confirmation means may be disposed on two sides in parallel with the direction where the slider 52 slides and the corresponding inner surfaces of the cavity of the case 51, respectively. Referring to FIG. 10, the same reference numerals as those in FIGS. 8 and 9 are attached to the elements corresponding to the configuration and function in the second embodiment, and the detail explanation in the third embodiment is omitted.

In the embodiments explained hereinabove, the electronic element is disposed on the first and the second members combined together so as to be moved relatively to each other and is operated in accordance with the relative movement of both the members. Particularly, the notch array and the position confirmation means are disposed at the different positions of the two members independently so as to produce the continuous click feelings within the operation range and the center click feeling at the center of the operation range. According to the present invention, the center click feeling can be easily set larger than the continuous click feelings. The center click feeling for identifying the center position of the controller can be certainly obtained within the operation range where continuous click feelings are obtained. Of course, the click feeling at the center has been merely explained as an example. An alternative structure may be configured that provides a relatively large click feeling which can identify a predetermined specific position of the controller within the operation range.

It is to be understood that the first and the second members are made of molded plastic resin. In the notch array and the position confirmation means, the pawls are snapped into the notches due to the resilient force of the plastic resin. The resin has a variation amount smaller than metals and maintains the resilient property. The resilient property of the resins is variable due to temperature changes and the resins tend to be subjected to plastic deformation, which makes it difficult to obtain an effective center click feeling in the notch array by forming a deep notch for center position confirmation. However, in the embodiments of the present invention, the independent notch array and the position confirmation means are disposed in the controller. As a result, the problem inherent in the conventional click generation means can be solved economically and structurally by the use of resin molding, while a relatively large click feeling can be obtained at a predetermined specific position within the operation range.

The controllers of the present invention can be used for manipulating volume controls and trims in the radio control transmitters. However, electronic devices intended to control by the controllers according to the present invention should not be restricted only to the radio control transmitters and to electronic devices installed in the radio control transmitters. The controller according to the present invention is broadly applicable to maneuver general electronic devices.

While there has been shown and described what are at present considered the preferred embodiment of the invention, it will be obvious to those skilled in the art that various changes and modifications can be made therein without departing from the scope of the invention defined by the appended claims.

What is clamed is:

1. A controller for an electronic device comprising:
a first member having a cylindrical base with a circumferential side wall;
a second member for adjusting an operation amount of said controller through a relative rotational movement of said first member and said second member by an operator, the second member having a strip-shaped resilience member formed in a circumferential shape around an axis of the rotational movement so as to bias itself against inside the base of the first member;
a notch array having a continuous serration disposed on an inner circumferential face of the side wall of the first member and a first pawl disposed on the resilience member of the second member while biased by the resilience member so that the first pawl is engaged movably to said continuous serration, said serration being formed along a relative moving direction of one of said first member and said second member, said first pawl being formed to the remaining one of said first and said second members and being engaged movably to said continuous serration; and
a position confirmation means disposed at a position different from said notch array, said position confirmation means having a single notch disposed at a different position from the continuous serration and a second pawl, said notch being formed on one of said first and said second members within a relative movement range of said first and said second members, said second pawl being disposed to the remaining one of said first and said second members and being engaged movably to said notch, the direction of said continuous serration and the direction of said first pawl in said notch array and the direction of said notch and the direction of the second pawl in the position confirmation means are disposed to be perpendicular to the relative moving direction of said first and said second members, wherein the first pawl is disposed on the inner circumferential face of the side wall of the first member, and the second pawl is disposed on the resilience member of the second member while biased by the resilience member so that the second pawl is engaged movably to said notch.

2. The controller as defined in claim 1, wherein said notch array and said position confirmation means are disposed vertically in an axis direction of the rotational movement.

3. The controller as defined in claim 1, wherein said notch array and said position confirmation means are disposed oppositely with respect to the center of rotation of said first and second members.

* * * * *